(12) United States Patent
Doyle

(10) Patent No.: US 10,208,893 B2
(45) Date of Patent: *Feb. 19, 2019

(54) HEAVY CAPACITY ARM SUPPORT SYSTEMS

(71) Applicant: ENHANCE TECHNOLOGIES, LLC, San Diego, CA (US)

(72) Inventor: Mark C. Doyle, Del Mar, CA (US)

(73) Assignee: ENHANCE TECHNOLOGIES, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,797

(22) Filed: Aug. 29, 2016

(65) Prior Publication Data

US 2016/0363264 A1 Dec. 15, 2016

Related U.S. Application Data

(63) Continuation of application No. 14/682,065, filed on Apr. 8, 2015, now Pat. No. 9,427,865.

(60) Provisional application No. 61/977,060, filed on Apr. 8, 2014.

(51) Int. Cl.
*F16M 11/00* (2006.01)
*F16M 13/04* (2006.01)
*B25J 9/00* (2006.01)

(52) U.S. Cl.
CPC ............ *F16M 13/04* (2013.01); *B25J 9/0006* (2013.01)

(58) Field of Classification Search
CPC .................................................. B25H 1/0028
See application file for complete search history.

(56) References Cited

U.S. PATENT DOCUMENTS

| 5,845,540 A | * | 12/1998 | Rosheim | B25J 3/04 414/4 |
| 6,301,526 B1 | * | 10/2001 | Kim | B25J 9/0006 600/1 |
| 8,641,782 B2 | * | 2/2014 | Kim | B25J 9/0006 414/5 |
| 9,156,154 B2 | * | 10/2015 | Brown | B25H 1/0021 |
| 9,375,325 B2 | * | 6/2016 | Garrec | B25J 9/0006 |
| 2007/0225620 A1 | * | 9/2007 | Carignan | A61H 1/0281 601/5 |
| 2010/0217163 A1 | | 8/2010 | Sankai | |
| 2011/0164949 A1 | | 7/2011 | Kim et al. | |

FOREIGN PATENT DOCUMENTS

WO 2009016478 A2 2/2009

OTHER PUBLICATIONS

European Patent Office, Search Report for Corresponding European Application No. 15776499.4-1018, dated Feb. 26, 2018, 9 pages.

* cited by examiner

*Primary Examiner* — Amy J. Sterling
(74) *Attorney, Agent, or Firm* — William A. English; Vista IP Law Group LLP

(57) ABSTRACT

Systems and methods are provided for supporting an arm of a user while using a tool that include a harness configured to be worn on a body of a user; an arm support pivotally coupled to the harness for supporting a user's arm; and a tool mount on a free end of the arm support for receiving a tool such that the tool is manipulatable by a hand of user's arm supported by the arm support. One or more compensation elements may be coupled to the arm support and/or the tool mount for at least partially offsetting a gravitational force acting on the user's arm and/or the tool received on the tool mount.

16 Claims, 17 Drawing Sheets

HEAVY CAPACITY ARM SUPPORT SYSTEMS

RELATED APPLICATION DATA

The present application is a continuation of application Ser. No. 14/682,065, filed Apr. 8, 2015, and issuing as U.S. Pat. No. 9,427,865, which claims benefit of provisional application Ser. No. 61/977,060, filed Apr. 8, 2014, the entire disclosures of which are expressly incorporated by reference herein.

BACKGROUND

Numerous tasks require people to work with their arms outstretched, e.g., while operating hand tools or other equipment that they must at least partially support themselves. Examples include construction, surgery, dentistry, painting, dishwashing, and product assembly. Persons engaged in such activities may experience fatigue from prolonged muscular efforts required to resist the force of gravity on their arms in order to keep them extended. Weak or disabled persons may experience fatigue performing daily tasks. Static arm rests on chairs and work tables are only effective if the task is performed within a relatively restricted area, for example, at a computer keyboard. Tasks that involve a greater range of motion are not aided by static armrests.

Thus, there is a need for systems that may relieve fatigue experienced by persons performing tasks involving moderate to large ranges of motion and/or operating tools or other equipment.

SUMMARY

The present invention is directed to systems, devices, and methods for supporting a user's arms, for example, to adaptive arm support systems or devices that support one or both of a user's arms, while allowing substantially free motion, e.g., to allow the user to perform one or more tasks for extended periods of time with one or both arms extended.

In accordance with a first embodiment, a system is provided for supporting an arm of a user while using a tool that includes a harness configured to be worn on a body of a user. An arm support may be pivotally coupled to the harness and configured to accommodate movement of the arm while following the movement without substantially interfering with the movement of the user's arm, the arm support including one or more compensation elements to at least partially offset a gravitational force acting on the arm. In an exemplary embodiment, the compensation elements may be a spring-pulley-cable assembly that is powerless and sensorless, i.e., does not need an electrical power source, motors, and the like. In addition, the system may include a tool mount including a first end pivotally coupled to the harness and a second free end for receiving a tool. The tool mount may include an arm having multiple degrees of freedom, e.g., for positioning the tool adjacent a hand of the arm supported by the arm support assembly. In addition or alternatively, the tool mount may also include one or more compensation elements to at least partially offset a gravitational force acting on the tool received on the second free end.

In accordance with another embodiment, a method is provided for supporting an arm of a user while using a tool that includes placing a harness on the user, the harness comprising an arm support movable relative to the harness and including an arm rest and a tool mount extending from the harness in front of the user; supporting a portion of the user's arm using the arm support such that the arm support subsequently follows movement of the user's arm; mounting a tool in a free end of the tool mount; and using the tool to perform one or more tasks, the tool mount comprising one or more compensation elements that apply an offset force to at least partially offset a gravitational force acting on the tool as the user moves without substantially interfering in the movement.

In accordance with yet another embodiment, a system is provided for supporting an arm of a user while using a tool that includes a harness configured to be worn on a body of a user, the harness comprising a shoulder harness configured to be worn over or around one or both shoulders of the user including a first pivot point above the shoulder of a user when the harness is worn by the user; and an arm support comprising a first arm support segment pivotally coupled to the first pivot point, a second arm support segment pivotally coupled to the first arm support segment for supporting an upper arm of the user, and a third arm support segment pivotally coupled to the second arm support segment for supporting a lower arm of the user. A tool mount may be coupled to the third arm support segment, e.g., for receiving a tool such that the tool may be manipulated by a hand of the user supported by the arm support. In addition, the system may include a first set of compensation elements coupled to the second arm support segment for at least partially offsetting a gravitational force acting on the upper arm, and a second set of compensation elements coupled to the third arm support segment for at least partially offsetting a gravitational force acting on the lower arm.

In accordance with still another embodiment, a system is provided for supporting an arm of a user while using a tool that includes a harness configured to be worn on a body of a user, and an arm support pivotally coupled to the harness. The arm support may include a plurality of segments for supporting a user's arm and a tool mount for receiving a tool such that the tool may be manipulated by a hand of the user's arm supported by the arm support. For example, the system may include one or more compensation elements coupled to the arm support for at least partially offsetting a gravitational force acting on the user's arm and/or the tool received on the tool mount.

In an exemplary embodiment, a body-mounted counterbalance mechanism may be provided for tools that may be mounted at the user's shoulder, e.g., that may substantially conform to the shape of the user's arm as it follows the motion of the user's arm.

In accordance with yet another embodiment, a method is provided for supporting an arm of a user while using a tool that includes placing a harness on the user, the harness comprising an arm support movable relative to the harness; supporting a portion of the user's arm using the arm support such that the arm support subsequently follows movement of the user's arm, the arm support comprising a first segment pivotally coupled to the harness about a first vertical axis adjacent the user's shoulder, a second segment adjacent the user's upper arm pivotally coupled to the first segment such that the second segment is rotatable about a second horizontal axis, and a third segment adjacent the user's forearm and pivotally coupled to the second segment; securing a tool in a tool mount coupled to the third segment; and using the tool to perform one or more tasks, the first and second segments comprising one or more compensation elements that apply an offset force to at least partially offset a gravitational force acting on the tool as the user moves without substantially interfering in the movement.

Other aspects and features of the present invention will become apparent from consideration of the following description taken in conjunction with the accompanying drawings.

BRIEF DESCRIPTION OF THE DRAWINGS

The invention is best understood from the following detailed description when read in conjunction with the accompanying drawings. It will be appreciated that the exemplary devices shown in the drawings are not necessarily drawn to scale, with emphasis instead being placed on illustrating the various aspects and features of the illustrated embodiments.

DETAILED DESCRIPTION OF THE EXEMPLARY EMBODIMENTS

Figure 1A:
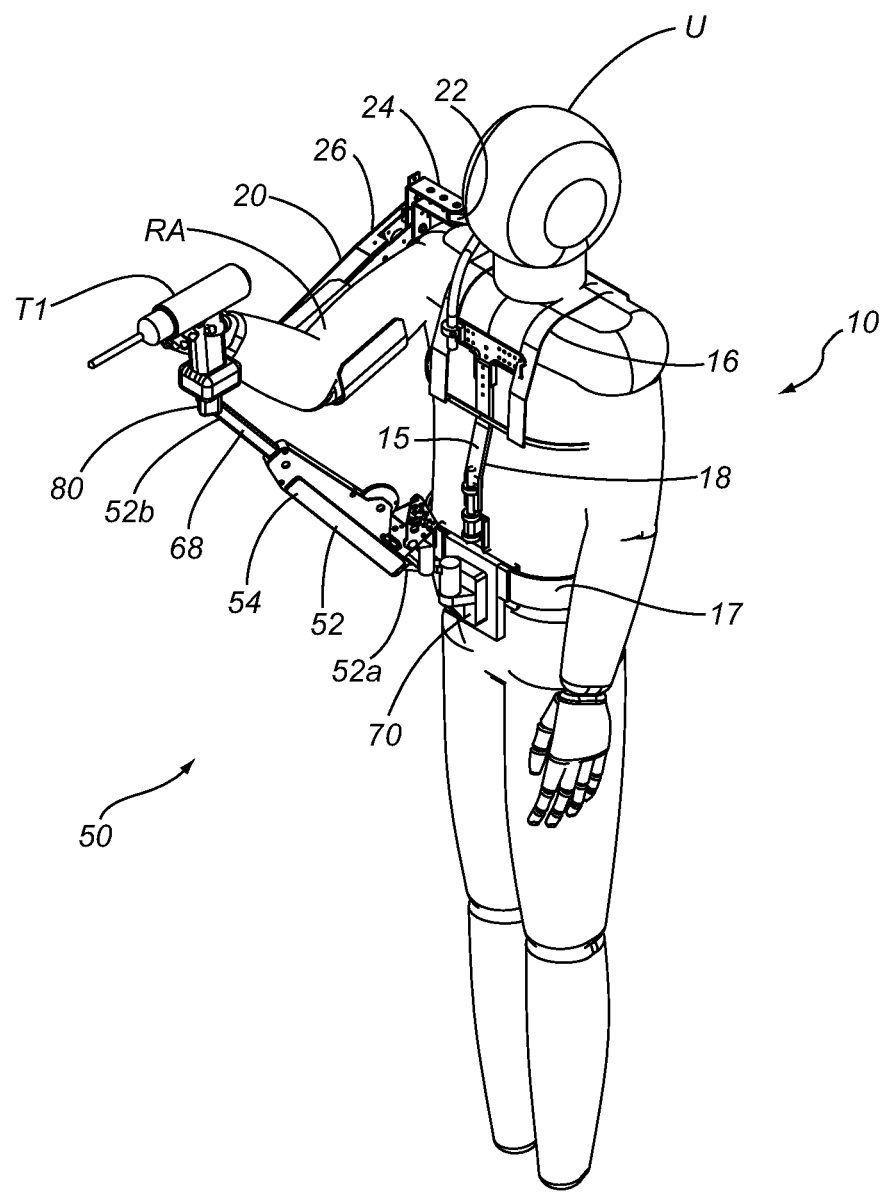
FIG. 1A shows a front perspective view of an exemplary embodiment of an arm support system worn by a user including a waist-mounted support system for a tool.

Turning to the drawings, FIGS. 1A-1D show an exemplary embodiment of a support system 10 that includes a harness 15 configured to be worn on a body of a user U, an adaptive arm support 20 for supporting an arm (or optionally both arms, not shown) of the user U, and a tool support system 50 for supported a tool T1 being used by the user U, e.g., for reducing gravitational forces on the arm of a user wearing the system 10 and operating the tool T1, as explained further below. Generally, the tool support system 50 includes a counterbalance arm 52 including a first end 52a pivotally mounted to the harness 15 by a bracket 70 and a second end 52 including a tool mount 82 attached at an optional gimbal 80.

The counterbalance arm 52 includes a cassette 54, which employs one or more pulleys, cables, and springs (not shown) to provide a generally upward supporting force to counterbalance the weight of the tool T1. The upward supporting force may be responsive to the position of the tool T1, e.g., through the geometry of the counterbalance arm 52, the shape of the pulleys, and/or the rate of the spring(s), in order to provide the desired counterbalancing characteristics. For example, the force may be configured to counterbalance all, or a portion of, the weight of the tool T1 consistently in all positions. Alternatively, the force may be configured to change as the position of the tool T1 is changed, e.g., raised or lowered as shown in FIGS. 1C and 1D.

Figure 1B:
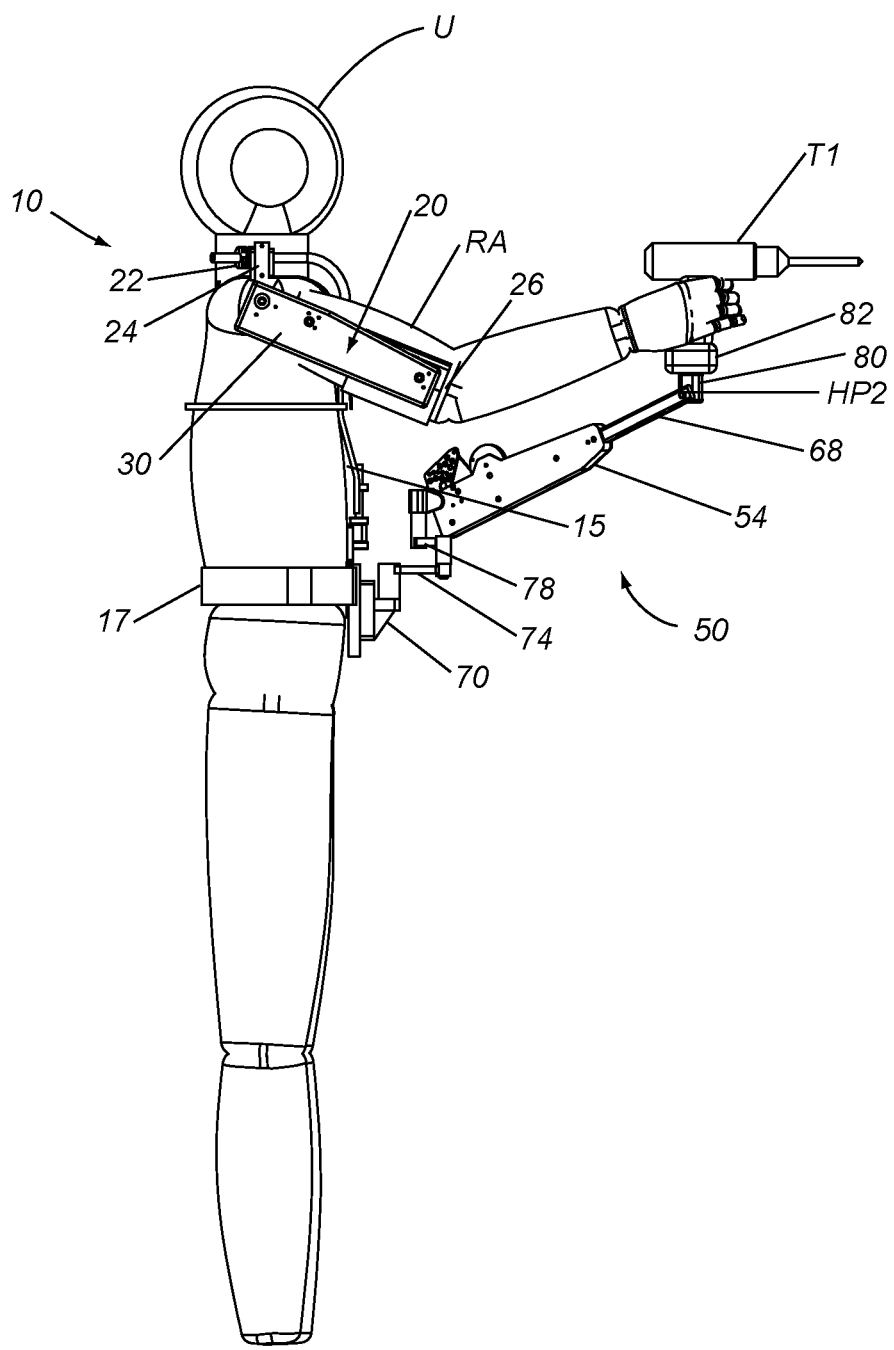
FIG. 1B shows a side view of the system of FIG. 1A worn by a user.
Figure 1C:
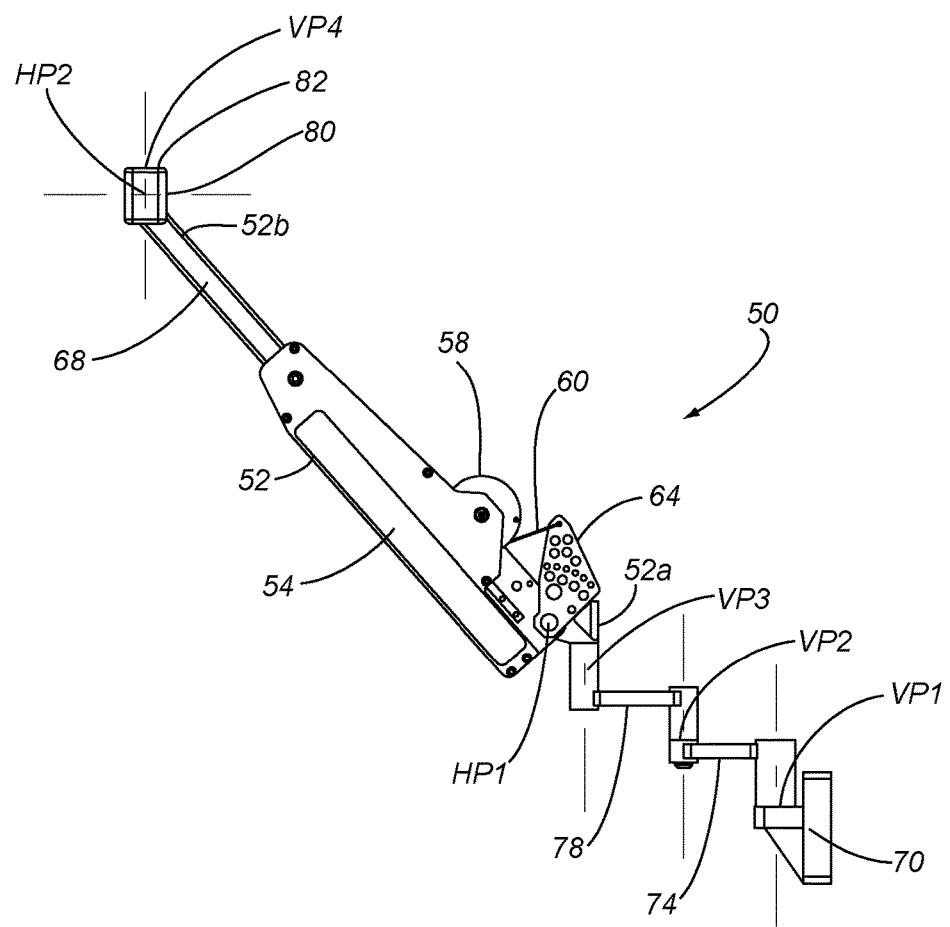
FIGS. 1C and 1D show a side view of a counterbalance arm of the system of FIGS. 1A and 1B in substantially raised and lowered positions, respectively.
Figure 1D:
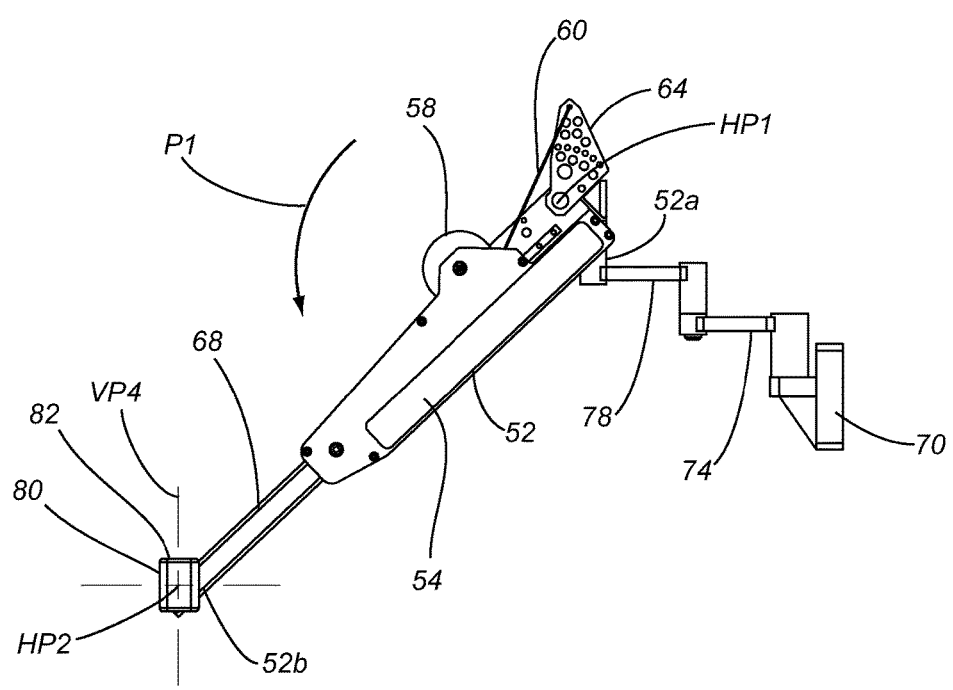

As shown in FIGS. 1A and 1B, the user U's right arm RA is optionally supported in an adaptive arm support 20, such as those disclosed in application Ser. No. 13/353,268, filed Jan. 18, 2012, Ser. No. 13/563,728, filed Jul. 31, 2012, and Ser. No. 14/102,466, filed Dec. 10, 2013, the entire disclosures of which are expressly incorporated by reference herein. Generally, the adaptive arm support 20 includes a shoulder bracket 22 fixedly mounted to the harness 15, e.g., above or adjacent the shoulder of the user U when the harness 15 is worn, a first arm support segment or bracket 24 pivotally mounted to the shoulder bracket 22 such that the first arm support segment is rotatable about a first or vertical pivot point or axis Dav, and a second arm support segment or bracket 26 pivotally coupled to the first arm support segment 24 such that the second arm support bracket 26 is rotatable about a second or horizontal pivot point or axis Dah generally orthogonal to the first vertical axis Dav. The second arm support bracket 26 is configured to extend along the user's upper arm and terminate adjacent the user's elbow, and may include an arm rest, e.g., including padding, securement straps, and the like (not shown), for securely and/or comfortably supporting the arm RA.

Figure 5:
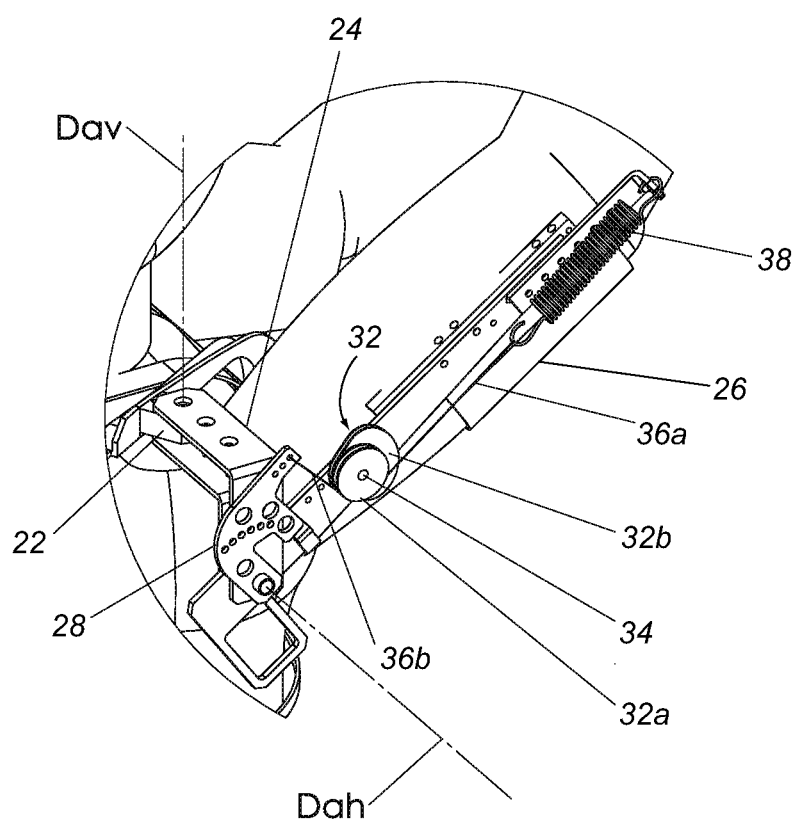
FIG. 5 is a perspective view of an exemplary embodiment of a pulley-spring mechanism that may be included in an arm support system.

The adaptive arm support 20 also includes a cassette 30 including one or more springs, pulleys, and/or other components for applying an offset force to at least partially offset a gravitational force acting on the arm RA as the user U moves and the arm support 20 follows the movement of the user's arm RA. An exemplary embodiment of the components of the cassette 30 (with a housing or cover removed) are shown in FIG. 5, which employs a dual pulley and cable design to manage forces. A first or dual path pulley 32 is pivotally joined to the second arm bracket 26 at a pivot point 34 at a location offset from the second pivot point Dah along the second arm bracket 26. The dual path pulley 32 may have an integral spring cable pulley 32a and integral cam cable pulley 32b fixed relative to one another yet rotatable together. The spring cable pulley 32a may have a substantially circular shape around pivot 34, while the cam cable pulley 32b may have an asymmetrical shape around the pivot 34, e.g., including a lobe that is further from the pivot 34 than the perimeter of the spring cable pulley 32a.

A spring cable 36a has a first end joined to one end of a spring or other resilient element 38 (with the other end of the spring 38 attached to the second arm support bracket 26), and a second end coupled to the spring cable pulley 32a. A cam cable 36b has a first end joined to the cam cable pulley 32b, and a second end joined to a cable anchor 28 secured to the first arm support bracket 24. In the raised arm position shown in FIG. 5, the spring 38 may be relatively retracted (i.e., at a lower potential energy state), and the effective radius of the spring cable pulley 32a and integral cam cable pulley 32b may be similar, allowing the spring cable 36a (transmitting the force stored in the spring 38) to have approximately equal influence on the dual path pulley 32 as cam cable 36b. When the arm Ar is moved to a lowered position, the spring 38 is at a higher potential energy state and the dual path pulley 32 has rotated about the pivot 34, which may bring the lobe on the cam cable pulley 32b into a position that presents a larger effective radius, and therefore a mechanical advantage, for the cam cable 36b to act on. The spring cable pulley 32a, having a smaller effective radius, provides substantially no mechanical advantage for the spring cable 36a. Thus, in this arrangement, the force applied to the user's arm RA may be modified based on the relative vertical position of the arm, as explained in the applications incorporated by reference herein.

Returning to FIGS. 1A and 1B, the harness 15 generally includes a shoulder harness 16 configured to be worn over or around the user's shoulders, an attachment band 17 configured to be worn around the user's torso, e.g., waist or hips, and one or more generally vertical supports or brackets extending between the shoulder harness 16 and the attachment band 17. For example, as shown, a vertical or front bracket 18 extends between the shoulder harness 16 and the attachment band 17 along the front of the user U, e.g., to provide a rigid support for supporting the tool support system 50. In addition, one or more back brackets (not shown) may extend along the back of the user U, e.g., to support the arm support system 20, similar to embodiments in the applications incorporated by reference herein.

With further reference to FIG. 1B, the tool support system 50 may include an adjustable extension bar 68 extending from the cassette 54, e.g., to allow the user U to extend or retract the bar 68 and thereby change the distance between the first and second ends 52a, 52b of the counterbalance arm 52, to accommodate the requirements of the task and the dimensions of the user U. The cassette 54 generally includes an elongate bracket or housing carrying one or more compensation elements, e.g., one or more springs, pulleys, cables, and the like (not shown), e.g., similar to the cassette 30 of the arm support system 20 described above and in the applications incorporated by reference herein.

The cassette 54 joins link arm 78 at the first end 52a of the counterbalance arm 52, which, in turn, joins link arm 74. Link arm 74 joins the bracket 70, which is attached to the harness 15. Link arms 74 and 78 serve to allow the user U to maneuver the counterbalance arm 52 in the horizontal plane, while providing substantially rigid support in the vertical plane, i.e., to allow the location of the first end 52a of the counterbalance arm 52 to be moved horizontally towards/away from the user U and/or left/right in front of the user U without the first end 52a moving vertically.

FIG. 1C shows a side view of the counterbalance arm 52 of the tool support system 50 in a substantially raised position. Consistent with the function described in the applications incorporated by reference herein, cable 60 attaches to anchor 64 and the pulley and spring system (not shown other than representative pulley 58, which may be a single circular or asymmetric pulley or a dual pulley including multiple pulleys with different geometries) within the cassette 54 to provide a configurable counterbalancing force. Optional gimbal 80, attached to the second end 52b of the counterbalance arm 52, e.g., to the extension bar 68, may pivot in the vertical plane about horizontal pivot HP2. Gimbal 80 may provide a substantially vertical pivot VP4 at which the tool T1 may be attached. These two pivots provide the user U the ability to rotate and tilt the tool T1. The link arm 78 is attached to the cassette 54 at vertical pivot VP3, and to the link arm 74 at vertical pivot VP2. The link arm 74, in turn, is attached to the bracket 70 at vertical pivot VP1. The link arms and associated pivots allow the counterbalance arm 50 to be rotated, swung, and extended as required during the task.

FIG. 1D shows a side view of the counterbalance arm 52 in a substantially lowered position. Consistent with the function described in the applications incorporated by reference herein, the cable 60 is now more extended out of the cassette 54, in response to the motion of the counterbalance arm 52 along path P1.

Turning to FIGS. 2A-2F, another exemplary embodiment of a high load adaptive arm support system 100 is shown. Consistent with the applications incorporated by reference herein, a user U wears a harness 120 (e.g., including a shoulder harness, attachment band, and one or more vertical supports or brackets), to which is attached an arm support assembly 110. Similar to other embodiments, the arm support system 100 generally includes a shoulder bracket 112 fixedly mounted to the harness 120, a first arm support bracket 114 pivotally coupled to the shoulder bracket 112 about a first or vertical pivot point or axis VP7, and a second arm support bracket 116 (including upper arm cassette 150) pivotally coupled to the first arm support bracket 114 about a second or horizontal pivot point or axis HP5. Thus, the arm support assembly 110 may pivot freely relative to the harness 120 at vertical pivot VP7 in response to motions of the user U's right arm RA. The arm support assembly 110 may also pivot about horizontal pivot HP5. A counterbalancing force may be applied by the upper arm cassette 150, consistent with the function described in the applications incorporated by reference herein.

In addition, the arm support system 110 includes a third arm support bracket 118 (including lower arm cassette 170) pivotally coupled to the second arm support bracket 116 for supporting a tool mount 190. The lower arm cassette 170 may provide a counterbalancing force to the third arm support bracket 118 and tool mount 190 (and to at least partially offset the weight of a tool T2), as described below. In the embodiment shown, the tool mount for tool T2 is a commercially available gimbal assembly 190, which is attached to the arm support assembly 110 via a gimbal rod 194 and link arm 198. The arm support assembly 110, thus attached to the harness 120 and the tool T2, acts to provide a generally upward force to counterbalance the weight of the tool T2, while generally following the motions of the user U's right arm RA during the performance of the task.

Figure 2A:
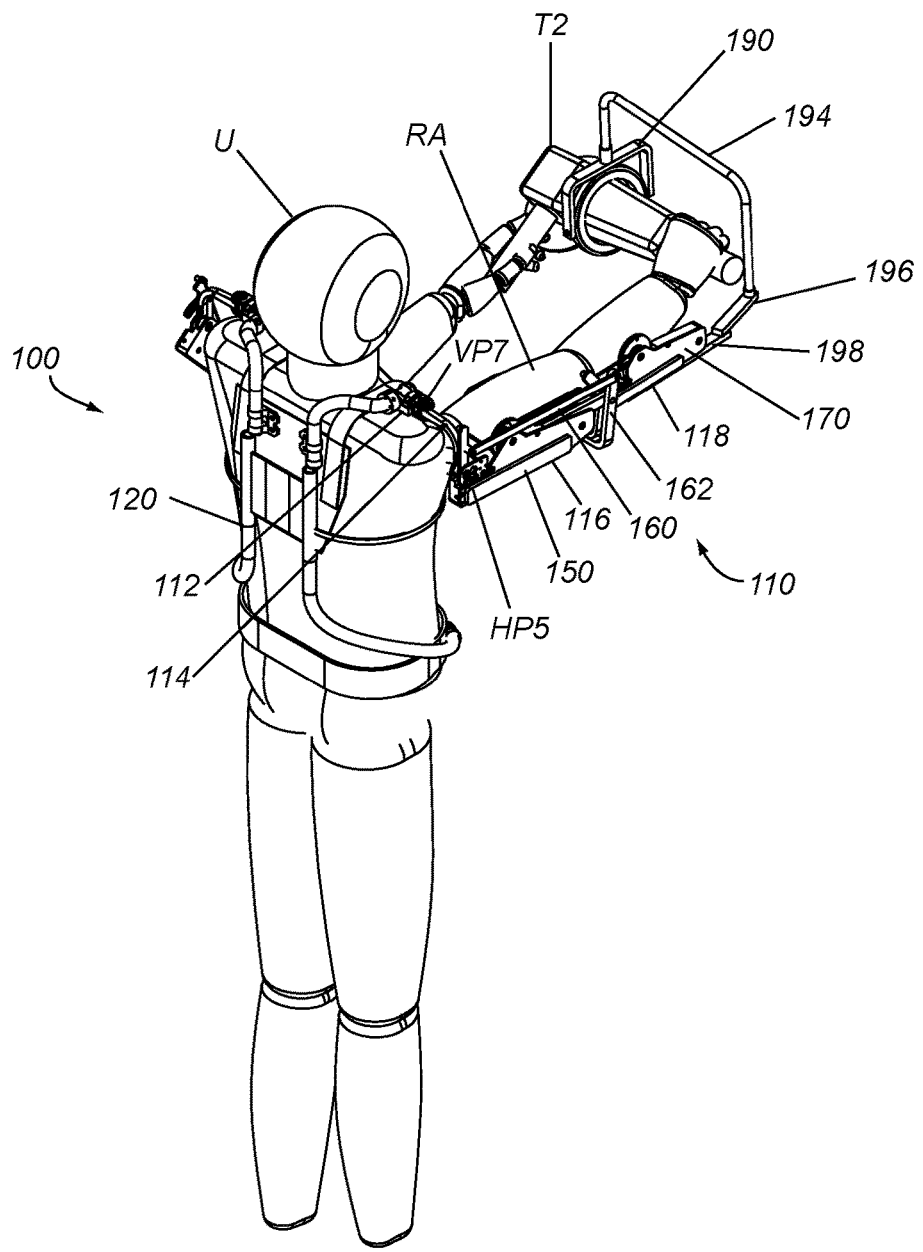
FIG. 2A shows a rear perspective view of another embodiment of a high load adaptive arm support system worn by a user.
Figure 2B:
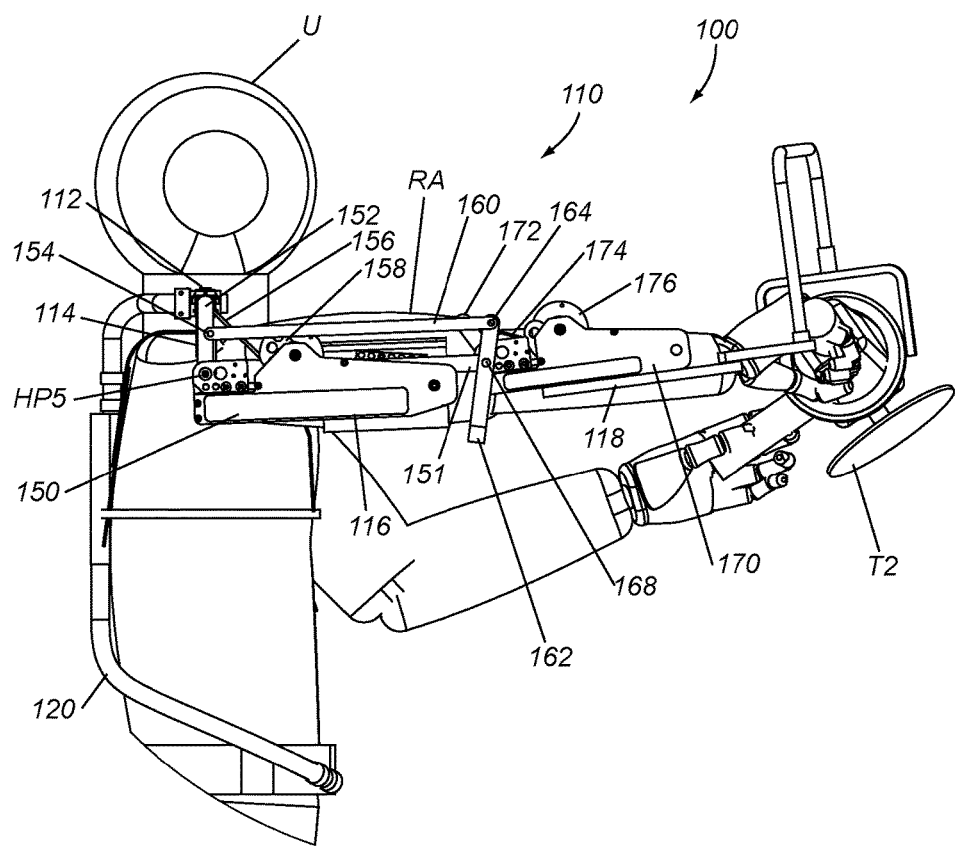
FIGS. 2B-2D show partial side views of the system of FIG. 2A worn by a user in various positions.

FIG. 2B shows a partial side view of the high load adaptive arm support system 100 of FIG. 2A. The right arm RA of the user U and the arm support assembly 110 are shown in a substantially horizontal orientation. Upper arm cassette 150, through cable 156 attached at upper anchor 152 (which is secured to the first arm support bracket 114), provides a generally upward counterbalancing force to the second arm support bracket 116. Optionally, the upper anchor 152 may be releasable from the harness 120 if desired to remove the counterbalancing force. The lower arm cassette 170, pivotally attached to vertical 4-bar link 162, also provides a generally upward counterbalancing force. Horizontal 4-bar link 160 is attached to upper anchor 152 at hinge 154, and to vertical 4-bar link 162 at hinge 164. The vertical 4-bar link 162 is attached also to cassette housing 151 at hinge 168. The cassette housing 151, the upper anchor 152, the horizontal 4-bar link 160, and the vertical 4-bar link 162 form a 4-bar linkage system, which serves to keep the vertical 4-bar link 162 substantially parallel to upper anchor 152 of the first arm support bracket 114.

Figure 2C:
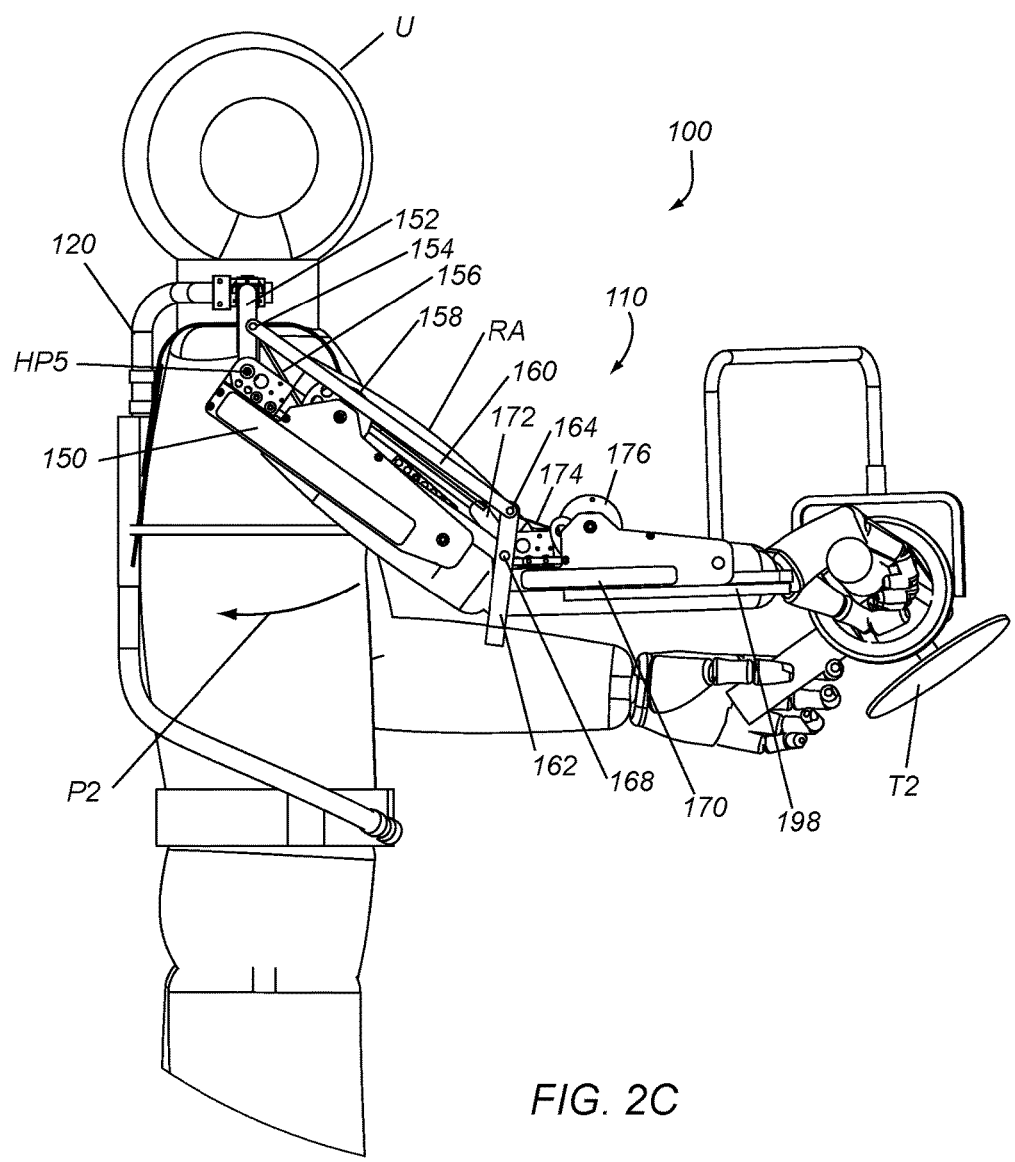

FIG. 2C shows a partial side view of the high load adaptive arm support system 100 of FIG. 2B. The right arm RA is shown with the upper arm angled downward, having pivoted about horizontal pivot HP5 along path P2, while the lower arm is still substantially horizontal. Consistent with the function described in the applications incorporated by reference herein, the upper arm cassette 150 is shown with the cable 156 extended further out of the upper arm cassette 150, as it acts to provide the desired counterbalancing force on the arm RA and tool T2. The lower arm cassette 170, through cable 174 and lower anchor 172, also provides a counterbalancing force. Although the user's upper arm has been lowered, the 4-bar linkage system (described above) serves to maintain vertical 4-bar link 162 substantially parallel to upper anchor 152. Because the vertical 4-bar link 162 provides the mounting for the lower arm cassette 170, the angle of the lower arm cassette 170 is thus not affected by changes in the angle of the user's upper arm. This serves to keep the counterbalancing force of lower arm cassette 170 substantially independent of the position of the upper arm cassette 150, thereby keeping the counterbalancing force of the lower arm cassette 170 only a function of the angle of that cassette.

Figure 2D:
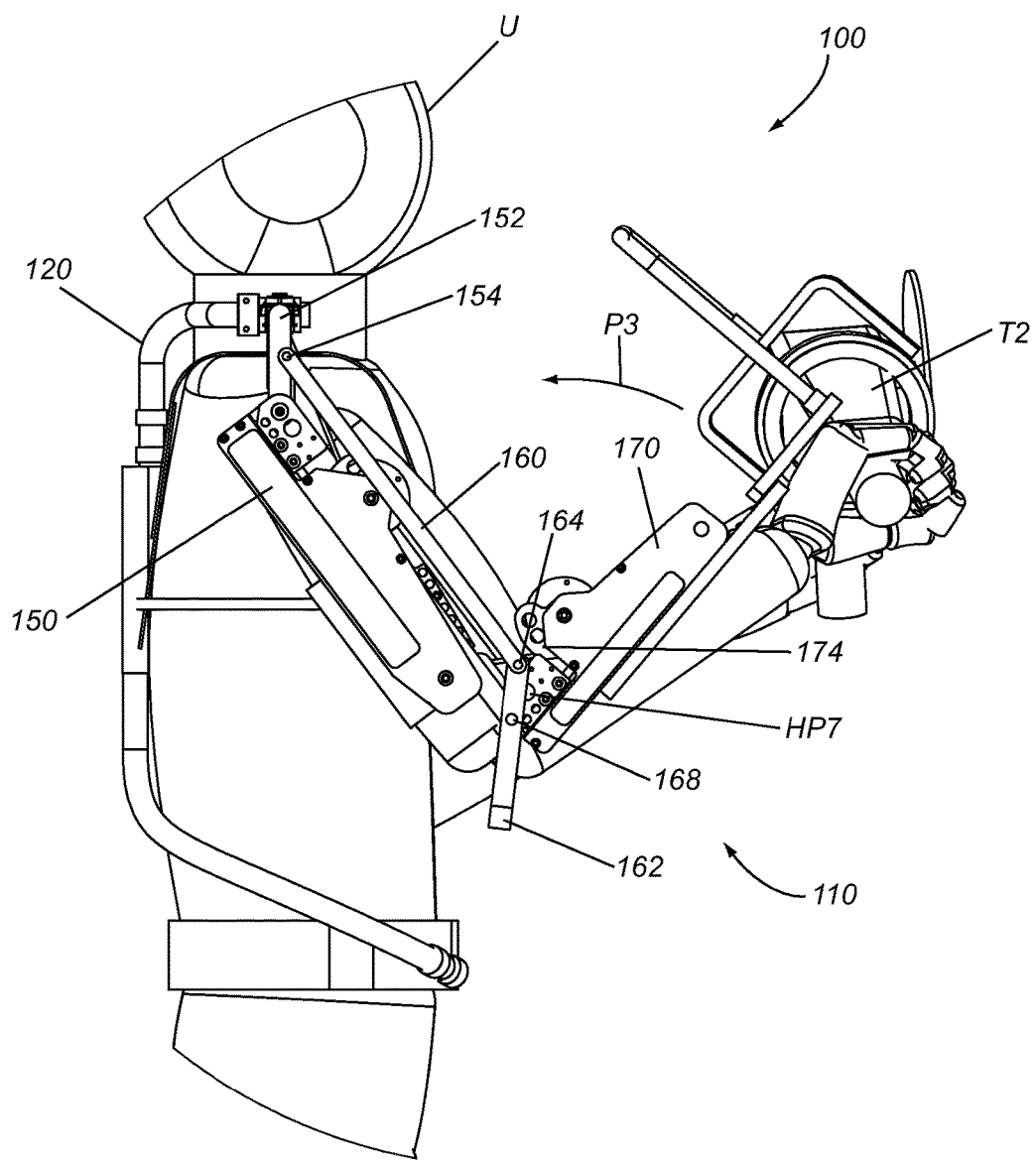

FIG. 2D shows a partial side view of the high load adaptive arm support system 100 of FIG. 2C. The right arm RA is shown with the upper arm angled downward, while the lower arm is shown angled upward, having pivoted about horizontal pivot HP7 along path P3. Consistent with the function described in the applications incorporated by reference herein, the cable 174 has retracted into the lower arm cassette 170 in response to the change in position.

Figure 2E:
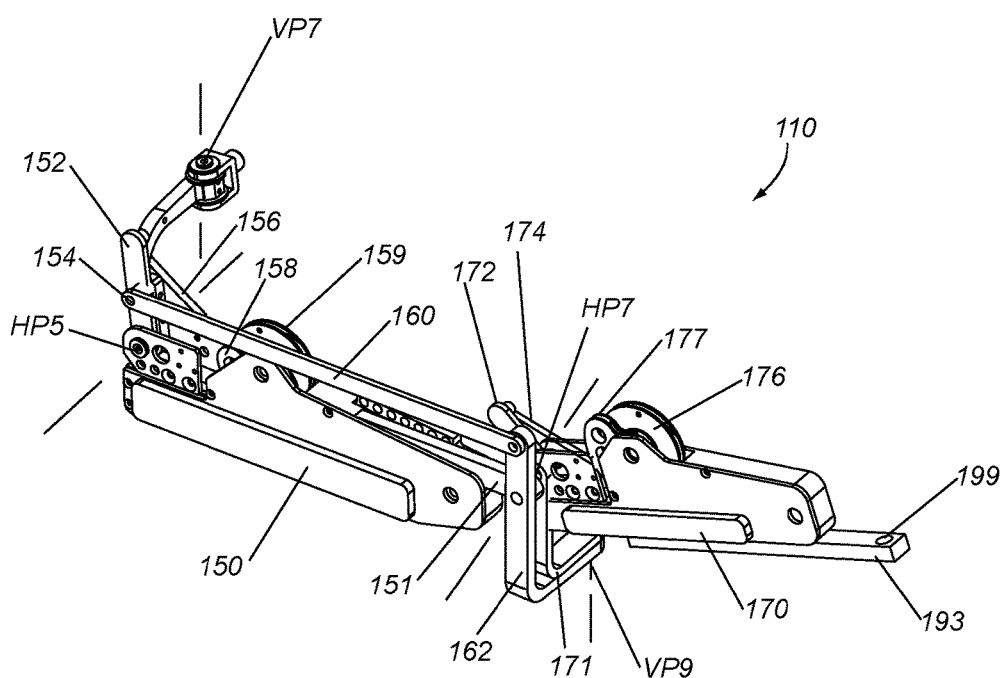
FIGS. 2E and 2F show perspective views of an arm support assembly of the system of FIGS. 2A-2D in different positions.

FIG. 2E shows a perspective view of the arm support assembly 110 of FIGS. 2A-2D. Elbow bracket 171 is pivotally mounted to the vertical 4-bar link 162 at vertical pivot VP9. The lower arm cassette 170 is pivotally mounted to the elbow bracket 171 at horizontal pivot HP7.

Figure 2F:
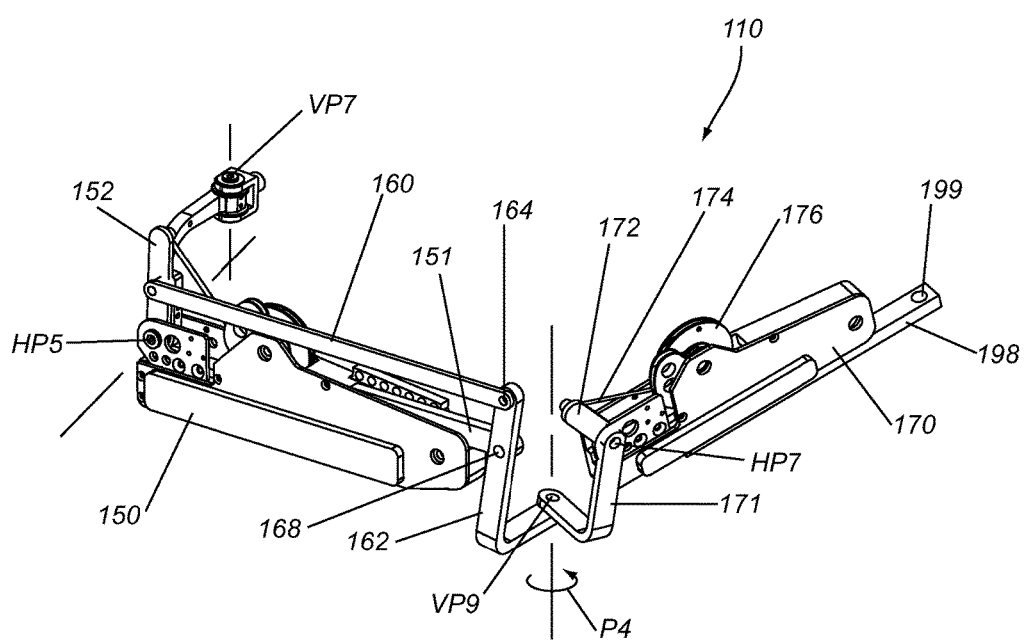

FIG. 2F shows a perspective view of the arm support assembly 110 of FIG. 2E, with the elbow bracket 171 rotated about vertical pivot VP9, along path P4 (consistent with the user bending their elbow in the horizontal plane). The lower arm cassette 170 and lower anchor 172, which are mounted to the elbow bracket 171, rotate with it. The elbow bracket 171, mounted to the vertical 4-bar link 162, is also kept substantially parallel to the upper anchor 152, even though it has rotated about vertical pivot VP9. Optionally, the lower anchor 172 may be releasable from the elbow bracket 171 if desired to remove the counterbalancing force.

Figure 3A:
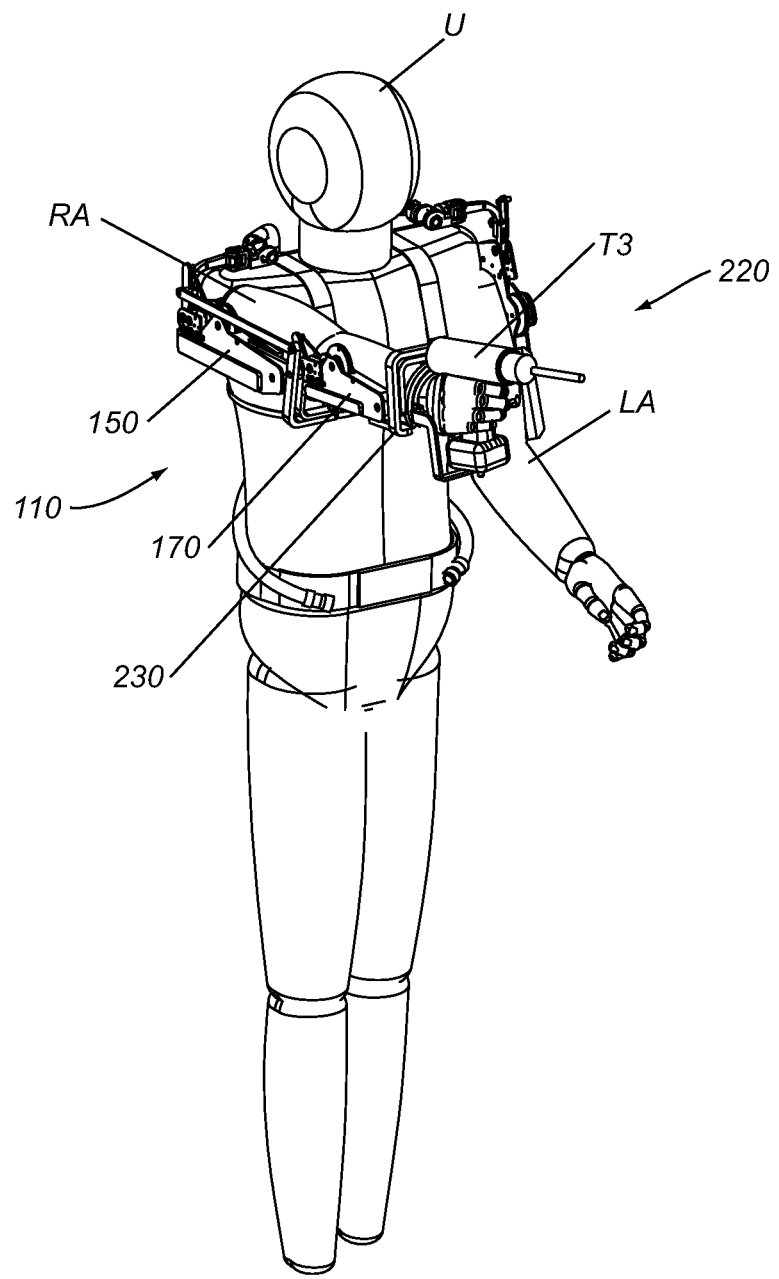
FIG. 3A shows a front perspective view of still another embodiment of a high load arm support system worn by a user including a tool mount.

FIG. 3A shows a front perspective view of another embodiment of a high load arm support system 220, which may be generally similar to the system 100 of FIGS. 2A-2F, e.g., including an arm support assembly 110, but employs a unique tool mount. The arm support assembly 110 is attached to tool mount 230 at or near the user U's wrist. The user U is shown holding tool T3, which is supported by the tool mount 230. The tool mount 230 may including one or more pivoting and/or swiveling components, e.g., centered on the user U's wrist, to enable natural motion of the wrist while guiding the tool T3 during the task.

Figure 3B:
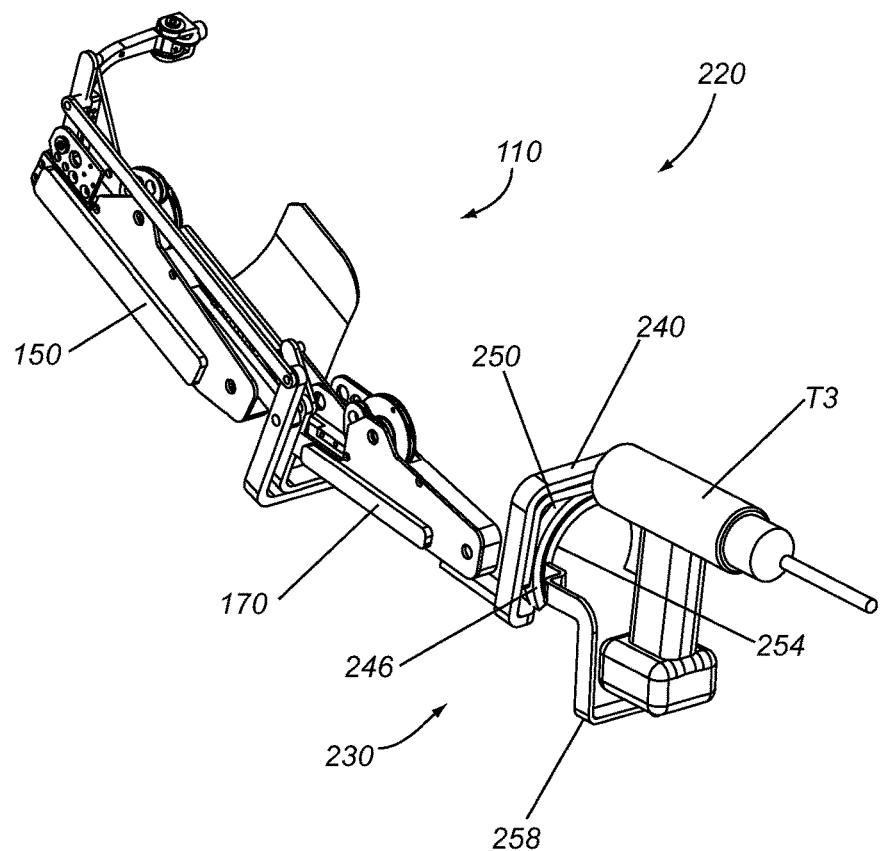
FIGS. 3B and 3C are perspective views of the arm support of the system of FIG. 3A with a tool mounted and removed, respectively, from a mount of the arm support.

FIG. 3B is a front perspective view of the arm support system 220 of FIG. 3A. Tool mount bracket 240 is attached to lower arm cassette 170, and may be adjustable along its length. Pivotally mounted to the tool mount bracket 240 is pivot frame 246. Mounted to the pivot frame 246 is gimbal frame 250. Within the gimbal frame 250 is gimbal ring 254, from which extends gimbal bracket 258. The tool T3 is mounted to the gimbal bracket 258, and may pivot relative to one another.

Figure 3C:
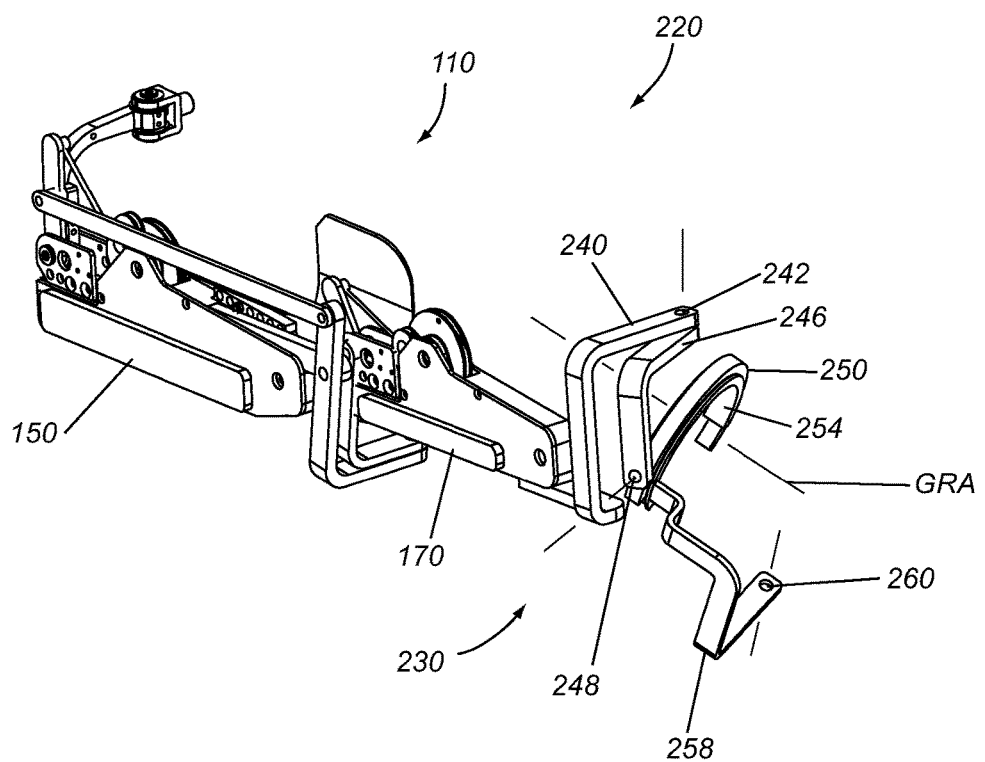

FIG. 3C is a front perspective view of the arm support system 220 of FIG. 3B, with the tool T3 removed, and with several of the pivoting and swiveling components shown in different positions to demonstrate their features. The tool mount bracket 240 is rigidly attached to the lower arm cassette 170, and provides hinge 242 at which the pivot frame 246 is pivotally mounted. The pivot frame 246, in turn, provides hinge 248, generally orthogonal to hinge 242, at which the gimbal frame 250 is pivotally attached. The gimbal ring 254 is mounted within the gimbal frame 250, and may rotate relative to it about gimbal rotation axis GRA. Extending from the gimbal ring 254 is gimbal bracket 258 to which the tool T3 (not shown) may be attached at socket 260. The hinge 242, hinge 248, rotating gimbal ring, and tool socket provide multiple rotational degrees of freedom, e.g., to accommodate motion of the user U's wrist and/or hand during performance of desired tasks.

Figure 4A:
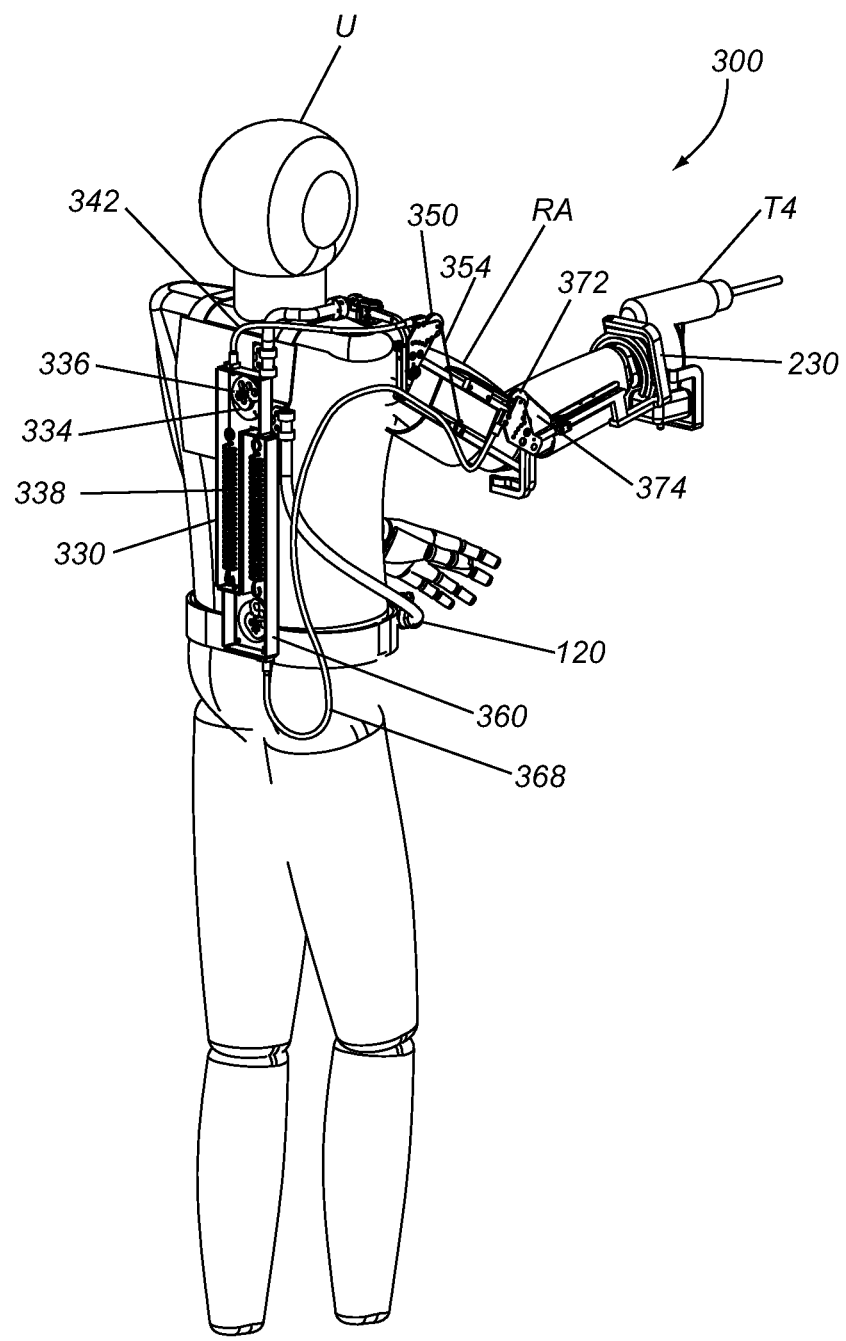
FIGS. 4A and 4B are rear and front perspective views, respectively, of yet another embodiment of a high load arm support system worn by a user.
Figure 4B:
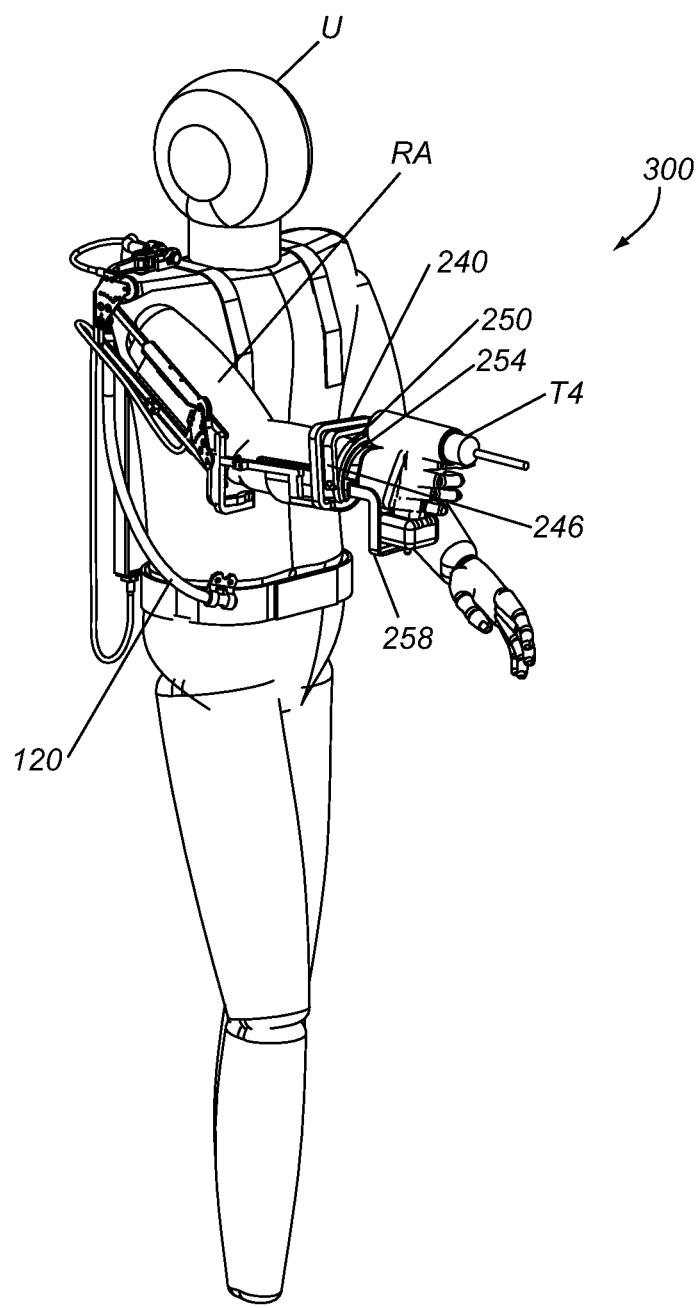

FIGS. 4A and 4B show an alternative embodiment of a high load arm support system 300, which differs from the systems shown in FIG. 2 and FIG. 3 in that the counterbalancing cassettes are mounted remotely (instead of on the side of the user U's arm). Generally, the user U wears a harness 120, as in previous systems. Cassettes 330, 360 are shown mounted on the back of the harness 120, although other configurations are possible. As described in the applications incorporated by reference herein, the function of the cassettes 330 and 360 is to provide a counterbalancing force to the user U's right arm RA, which may vary with arm position. That counterbalancing force transmitted by cables from the cassettes 330, 360, through cable housings 342 and 368, to the components supporting the user U's arm and tool T3.

Figure 4C:
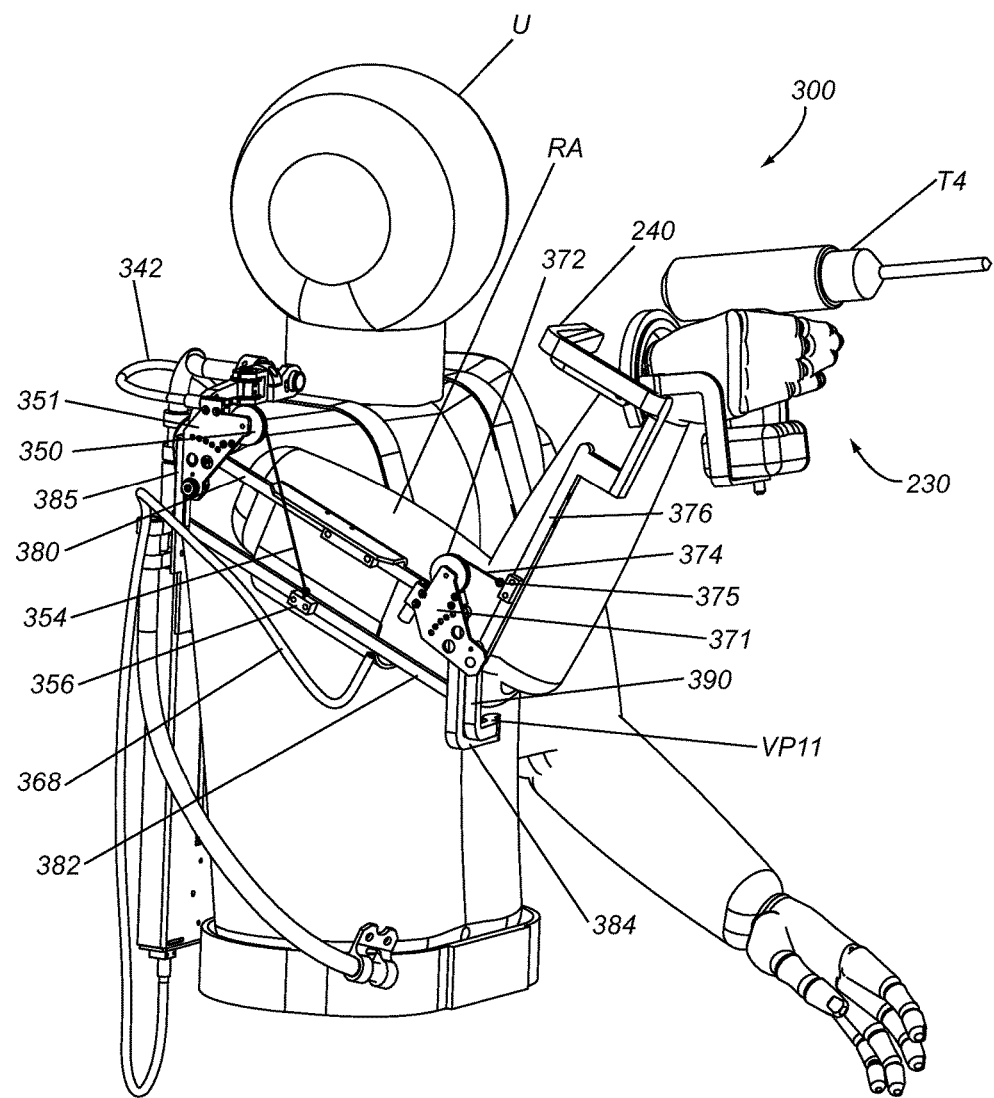
FIG. 4C is a detail of the system of FIGS. 4A and 4B worn by a user.

FIG. 4C is a partial front perspective view of the high load arm support system 300 of FIG. 4B. Cable 354, transmitting force from cassette 330 through cable housing 342, wraps around pulley 350 and terminates at anchor ring 356 on lower 4-bar link 382. The pulley 350 is attached to upper pulley mount 351. Vertical 4-bar link 385, lower 4-bar link 382, upper 4-bar link 380, and 4-bar bracket 384 form a 4-bar linkage that keeps 4-bar bracket 384 parallel to vertical 4-bar link 385, similar to the 4-bar linkage of FIG. 2. Lower pulley mount 371 is mounted on the 4-bar bracket 384, and thus does not rotate as the user U rotates their upper arm. Lower pulley 372 is mounted on the lower pulley mount 371. Cable 374, transmitting force from cassette 360 through cable housing 368, wraps around the lower pulley 372, and terminates at anchor ring 375 on forearm bracket 376. Tool mount bracket 240 of tool mount 230 is attached to forearm bracket 376 (other tool mounting structures are contemplated, such as the embodiment shown in FIG. 2).

Although not shown in all images, arm rests may be provided for the user's upper and lower arms in any of the embodiments herein.

In addition or alternatively, provisions for the user adjusting the counterbalancing force may be included, for example, a ratchet or knob mechanism that permits the user to increase the force as desired.

In addition or alternatively, damping or speed control elements may be included as necessary to slow and/or otherwise control the motion of the various counterbalancing mechanisms described herein.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

It will be appreciated that elements or components shown with any embodiment herein are exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A system for supporting an arm of a user while using a tool, comprising:

a harness configured to be worn on a body of a user, the harness comprising a shoulder harness configured to be worn over or around one or both shoulders of the user including a shoulder bracket fixedly mounted adjacent the shoulder of a user when the harness is worn by the user;

an arm support comprising a first arm support segment pivotally coupled to the shoulder bracket such that the first arm support segment is rotatable freely about a vertical pivot point, a second arm support segment pivotally coupled to the first arm support segment for extending along an upper arm of the user such that the second arm support segment is rotatable about a horizontal pivot point, and a third arm support segment pivotally coupled to the second arm support segment for supporting a lower arm of the user;

a linkage coupled between the first arm support segment and the third arm support segment such that a vertical angle of the third arm support segment is not substantially affected by rotation of the second arm support segment;

a tool mount coupled to the third arm support segment configured to receive a tool; and a first set of compensation elements coupled to the second arm support segment for at least partially offsetting a gravitational force acting on the upper arm, and a second set of compensation elements coupled to the third arm support segment for at least partially offsetting a gravitational force acting on the lower arm.

2. The system of claim 1, wherein the first set of compensation elements are mounted at least partially on the second arm support segment.

3. The system of claim 2, wherein the second set of compensation elements are mounted at least partially on the third arm support segment.

4. The system of claim 1, wherein the first and second sets of compensation elements are mounted on the harness, and wherein a plurality of cables couple the first and second sets of compensation elements to the second and third arm support segments, respectively.

5. The system of claim 1, wherein the first arm support segment is configured to rotate about a first vertical axis to follow horizontal rotation of the user's arm.

6. The system of claim 5, wherein the second arm support segment is configured to rotate about a second horizontal axis to follow vertical rotation of the user's upper arm.

7. The system of claim 6, wherein the third arm support segment is configured to rotate about a third axis to follow rotation of the user's lower arm relative to the user's upper arm.

8. A system for supporting an arm of a user while using a tool, comprising:

a harness configured to be worn on a body of a user, the harness comprising a shoulder harness configured to be worn over or around one or both shoulders of the user including a first pivot point adjacent the shoulder of a user when the harness is worn by the user;

an arm support comprising a first arm support segment pivotally coupled to the first pivot point, a second arm support segment pivotally coupled to the first arm support segment for extending along an upper arm of the user, and a third arm support segment pivotally coupled to the second arm support segment for supporting a lower arm of the user;

a linkage coupled between the first arm support segment and the third arm support segment such that a vertical angle of the third arm support segment is not substantially affected by rotation of the second arm support segment;

a tool mount coupled to the third arm support segment; and a first set of compensation elements coupled to the second arm support segment for at least partially offsetting a gravitational force acting on the upper arm, and a second set of compensation elements coupled to the third arm support segment for at least partially offsetting a gravitational force acting on the lower arm, wherein a second end of the first arm support segment is pivotally coupled to a first end of the second arm support segment at a first horizontal pivot point, and a second end of the second arm support segment is disposed adjacent a first end of the third arm support segment, wherein the linkage comprises a first link pivotally coupled to the second end of the second arm support segment and a second link pivotally coupled between the second end of the first arm support segment and the first link such that the second link extends substantially parallel to the second arm support segment and the first link remains substantially parallel to the first arm support segment when the second arm support segment is rotated, and wherein a first end of the third arm support segment is pivotally coupled to the first link.

9. The system of claim 8, wherein the first and second sets of compensation elements comprise first and second spring-pulley-cable assemblies, respectively, wherein an offset force of the first spring-pulley-cable assembly is variable based on a rotation angle of the second arm support segment independent of a rotation angle of the third arm support segment, and wherein an offset force of the second spring-pulley-cable assembly is variable based on the rotation angle of the third arm support segment independent of the rotation angle of the second arm support segment.

10. The system of claim 8, wherein the linkage further comprises an elbow bracket pivotally coupled to the first link about a vertical pivot point, and wherein the first end of the third arm support segment is pivotally coupled to the elbow bracket about a horizontal pivot point, wherein the vertical pivot point accommodates bending of the forearm of the user within a substantially horizontal plane.

11. The system of claim 10, wherein the elbow bracket nests at least partially in the first link when the second and third arm support segments are substantially straight.

12. The system of claim 1, wherein the tool mount comprises a pivot frame pivotally coupled to the third arm support segment.

13. The system of claim 12, wherein the tool mount further comprises a gimbal device pivotally coupled to the pivot frame to provide multiple degrees of freedom for a tool secured to the tool mount.

14. The system of claim 13, wherein the tool mount further comprises a socket coupled to the gimbal device for receiving a portion of the tool.

15. A system for supporting an arm of a user while using a tool, comprising:
 a harness configured to be worn on a body of a user, the harness comprising a shoulder harness configured to be worn over or around one or both shoulders of the user including a shoulder bracket fixedly mounted to the harness adjacent the shoulder of a user when the harness is worn by the user;
 an arm support comprising a first arm support segment pivotally coupled to the shoulder bracket such that the first arm support segment is rotatable freely about a vertical pivot point, a second arm support segment pivotally coupled to the first arm support segment for extending along an upper arm of the user such that the second arm support segment is rotatable about a horizontal pivot point, and a third arm support segment pivotally coupled to the second arm support segment for supporting a lower arm of the user;
 a linkage coupled to the first arm support segment and the third arm support segment such that a vertical angle of the third arm support segment is not substantially affected by rotation of the second arm support segment; and
 a first set of compensation elements coupled to the second arm support segment for at least partially offsetting a gravitational force acting on the upper arm, and a second set of compensation elements coupled to the third arm support segment for at least partially offsetting a gravitational force acting on the lower arm.

16. The system of claim 15, wherein the first set of compensation elements comprises a first spring assembly, and the second set of compensation elements comprises a second spring assembly.

* * * * *